July 5, 1949.  C. G. SCHERKENBACH  2,475,522
NIGHT LENS FOR DEFLECTING LIGHT RAYS
Filed Oct. 15, 1947

INVENTOR
CLARENCE G. SCHERKENBACH

BY

ATTORNEYS

Patented July 5, 1949

2,475,522

UNITED STATES PATENT OFFICE 2,475,522

NIGHT LENS FOR DEFLECTING LIGHT RAYS

Clarence G. Scherkenbach, Milwaukee, Wis.

Application October 15, 1947, Serial No. 780,058

1 Claim. (Cl. 2—14)

My invention refers to anti-glare, tinted eye glasses, especially adapted for use in automobiles or other vehicles for night driving. The glasses are also applicable to any night work wherein brilliant lights are necessary.

The object of my invention is to provide smoked or opaque lenses, having a central cut out sight aperture therein, whereby light rays striking the lens will be absorbed or deflected in such a manner that the vision is not blinded, whereby observation of an approaching object is clear to prevent accidents.

A further object of my invention is to provide concavo-convexed opaque lenses, fabricated from glass, plastic or other material, the same having a vertically disposed oval opening therein, whereby clear vision results. Thus, the oval or elongated aperture in the lens will permit downward, upward or a straight line vision and also the curved lens is capable of deflecting light rays traveling around a corner due to the concavo, convexed lens.

A further object of my invention is to provide the edges of the aperture with beveled spaces which angle surfaces flare away from the pupil of the eye, whereby the light rays are absorbed or broken up.

Thus, the lens having an aperture therein, or what might be termed a "teardrop aperture," is an important feature of the invention, it being understood that the lens may be concavo-convexedly ground or pressed.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
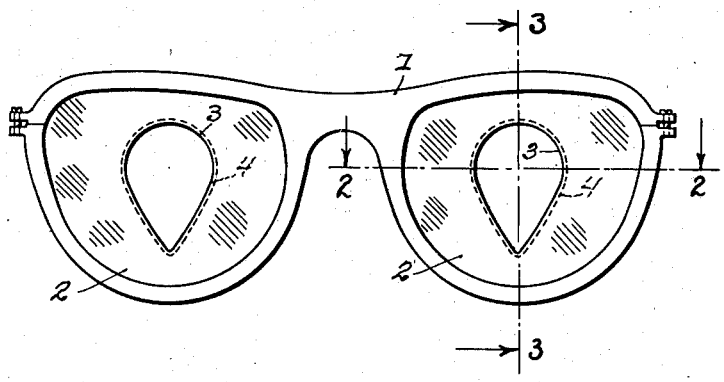
Figure 1 is a front elevation of an eye glass embodying the features of my invention.
Figure 2:
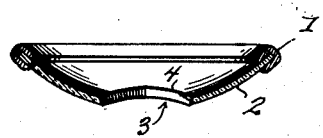
Figure 2 is a horizontal section through one of the lenses, the section being indicated by line 2—2 of Figure 1.
Figure 3:
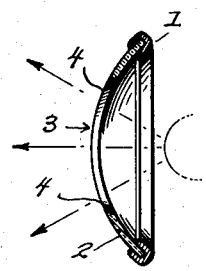
Figure 3 is a vertical section through said lens, the section being indicated by line 3—3 of Figure 1.

Referring by characters to the drawings 1 indicates a type of frame having fitted therein concavo-convexed lenses 2—2. The lenses are provided with centrally disposed oval apertures 3, the same being vertically disposed whereby clear vision of the user will result in an upwardly directed angle, a vertical line, or a downwardly directed angle, as indicated by the arrows in Figure 3 of the drawings.

It will be noted that the edges of the oval apertures, as indicated by the numeral 4, are beveled from the outer edge of the lens and flaring at an angle from the central vision point of the eye, whereby light rays striking this beveled surface will be broken up or deflected and the outside knife edge which is developed will present clear vision without light ray deflections.

The lens may be molded, pressed or ground in their concavo-convexed form, and the same is smoked or opaqued by any suitable method, wherein due to their non-transparency, light rays are softened.

From the foregoing description, it is apparent that the user of the glasses will, at all times, have a clear vision through the apertures thereof for night driving, and sharp light rays will not be directed into the pupil of the eye, whereby blinding glare is avoided, it being understood that even though such light rays strike through the center of the oval, due to vibration or slight movement of the head of the user of said glasses, these direct rays will be shifted and absorbed by the opaque or colored lens.

It will also be apparent due to the curvature of the lenses that light rays directed around a curve will be broken up or absorbed in order to eliminate temporary blinding of the user to thus, under all conditions, render driving more safe.

It will also be noted that while I have particularly considered use of the glasses in connection with vehicles traveling at night, the same may be efficiently used in night work requiring a plurality of bright lights.

While I have illustrated, as an exemplification of my invention, a lens with a center aperture or clear spot therein in fixed relation to the frame, in some instances, I may provide a circular lens having a central slit therein with means for rotating it whereby the angle of the aperture therein is varied.

I claim:

An anti-glare glass comprising a concavo-convex opaque lens having a central clear vision aperture therein in the form of a semi-circular top portion merging downwardly in curved lines to a central point without interruptions, the edges of the opening being beveled inwardly and flared outwardly to present a knife edge at the outer face of the lens.

CLARENCE G. SCHERKENBACH.

REFERENCES CITED

The following references are of record in the file of this patent:

UNITED STATES PATENTS

| Number | Name | Date |
|---|---|---|
| 1,206,133 | Otte | Nov. 28, 1916 |
| 1,683,505 | Walker | Sept. 4, 1928 |